(12) United States Patent
Hirayama (10) Patent No.: US 7,733,579 B2
(45) Date of Patent: Jun. 8, 2010

(54) IMAGE PICKUP SYSTEM

(75) Inventor: Hiroshi Hirayama, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 362 days.

(21) Appl. No.: 11/698,909

(22) Filed: Jan. 29, 2007

(65) Prior Publication Data

US 2007/0177280 A1    Aug. 2, 2007

(30) Foreign Application Priority Data

Jan. 31, 2006   (JP)   ............... 2006-022464

(51) Int. Cl.
| | |
|---|---|
| G02B 13/00 | (2006.01) |
| G02B 3/00 | (2006.01) |
| F21V 9/04 | (2006.01) |
| F21V 9/06 | (2006.01) |
| G02B 5/08 | (2006.01) |
| G02B 5/20 | (2006.01) |

(52) U.S. Cl. .................................. 359/722; 359/359
(58) Field of Classification Search ......... 359/793–795, 359/717, 691, 692, 589, 359
See application file for complete search history.

(56) References Cited

U.S. PATENT DOCUMENTS 7,158,207 B2 *  1/2007  Miniaci ................ 352/203
2005/0036217 A1 *  2/2005  Nozawa ................ 359/793

FOREIGN PATENT DOCUMENTS

JP    10-10423    1/1998

* cited by examiner

Primary Examiner—Alicia M Harrington
(74) Attorney, Agent, or Firm—Finnegan, Henderson, Farabow, Garrett, & Dunner, LLP (57) ABSTRACT

An image pickup system includes one or more optical elements, wherein an infrared cut coating in which a maximum value of reflectance at the wavelength $\lambda$ of 800 to 1200 nm is 30% or more, is formed on at least two optical surfaces of the optical elements.

12 Claims, 7 Drawing Sheets

IMAGE PICKUP SYSTEM

BACKGROUND OF THE INVENTION

1. Field of the Invention

The present invention relates to an image pickup system. In particular, the present invention relates to an image pickup system having an infrared cut function.

2. Description of Related Art

In optical systems for a digital still camera and a digital video camera, light-receiving elements such as CCD or CMOS are used. These light-receiving elements have a high sensitivity not only in a visible region but also in an infrared region. Thus, in order to provide a light-receiving characteristic close to the visibility, it is required that light having a wavelength $\lambda$ of 800 to 1200 nm is cut. Conventionally, an infrared cut filter in which dozens of high refractive index materials and low refractive index materials were alternately layered on a glass substrate, has been used.

However, an optical element in which the infrared cut filter is formed on a glass substrate, is expensive. Further, because the glass substrate is thick, it is difficult to fully satisfy the recent requirements for a smaller and thinner optical system. A technique in which a smaller and thinner optical system is provided by forming an infrared cut filter on one surface of the outermost lens in an image pickup system lens, is known (for example, Japanese Patent Unexamined Publication No. 10-10423).

However, in case that an image pickup system lens is made of plastic, when a laminated film composed of dozens of layers for cutting light having wavelength $\lambda$ of 800 to 1200 nm, is formed, there was a problem of the significant technical difficulty because of a risk of surface deformation or the like due to crack or stress. Furthermore, when a glass lens as an image pickup system lens is coated with dozens of infrared cut filters, there was a problem that the cost of the above coating is the same as that of an infrared cut coating of a glass substrate.

SUMMARY OF THE INVENTION

The present invention has been made in view of the above. An object of the present invention is to provide an image pickup system having an infrared cut function that is suitable for a smaller and thinner optical system and the reduction of the cost thereof.

In order to solve the above problem, according to the first aspect of the present invention, an image pickup system comprises one or more optical elements, wherein an infrared cut coating in which a maximum value of reflectance at the wavelength $\lambda$ of 800 to 1200 nm is 30% or more, is formed on at least two optical surfaces of the optical elements.

In the image pickup system, preferably, at least one optical surface of the optical elements has the infrared cut coating on a glass substrate.

In the image pickup system, preferably, at least one optical surface of the optical elements has the infrared cut coating on a plastic film.

In the image pickup system, preferably, at least one optical surface or at least two optical surfaces of the optical elements have the infrared cut coating on an image pickup lens.

In this case, preferably, the image pickup lens on which the infrared cut coating is formed, is made of plastic.

In the image pickup system, preferably, the image pickup system has a layered structure in which when a design wavelength is $\lambda_0$, a refractive index of a low refractive index layer is $n_L$, a thickness of the low refractive index layer is $d_L$, a refractive index of a high refractive index layer is $n_H$, a thickness of the high refractive index layer is $d_H$, and each layer of the infrared cut coating is sequentially numbered as a first layer, a second layer, a third layer . . . from an air side, the infrared cut coating satisfies following conditions:

800 nm $\leq \lambda_0 \leq$ 1200 nm,
$1.3 \leq n_L \leq 1.6$,
$1.8 \leq n_H \leq 2.3$,
the first layer satisfies $0.08\lambda_0 \leq n_L d_L \leq 0.17\lambda_0$,
the second layer satisfies $0.2\lambda_0 \leq n_H d_H \leq 0.3\lambda_0$, and
the third layer satisfies $0.2\lambda_0 \leq n_L d_L \leq 0.3\lambda_0$.

In this case, preferably, a fourth layer satisfies $0.2\lambda_0 \leq n_H d_H \leq 0.3\lambda_0$.

In this case, preferably, a fifth layer satisfies $0.2\lambda_0 \leq n_L d_L \leq 0.3\lambda_0$.

In this case, preferably, a sixth layer satisfies $0.2\lambda_0 \leq n_H d_H \leq 0.3\lambda_0$.

In this case, preferably, a seventh layer satisfies $0.2\lambda_0 \leq n_L d_L \leq 0.3\lambda_0$.

In this case, preferably, an eighth layer satisfies $0.2\lambda_0 \leq n_H d_H \leq 0.3\lambda_0$.

According to the present invention, it is possible to provide an image pickup system having an infrared cut function that is suitable for a smaller and thinner optical system and the reduction of the cost thereof.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein.

PREFERRED EMBODIMENT OF THE INVENTION

Hereinafter, one embodiment of an image pickup system according to the present invention will be described with reference to the drawings. However, the shown examples do not limit the scope of the invention.

Figure 1:
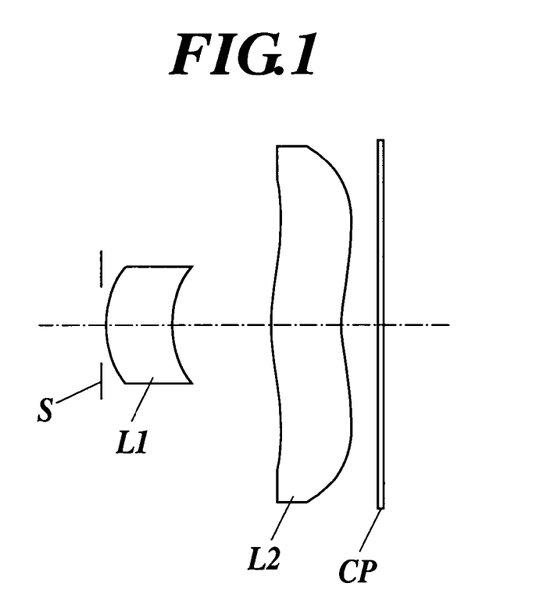
FIG. 1 is a cross-sectional view of a lens of an image pickup system of the present embodiment.

FIG. 1 is a view showing the structure of a lens group of a photographing (image pickup) system (zoom lens in this case) according to the present embodiment. As shown in FIG. 1, the image pickup system comprises a stop S, a first lens L1, a second lens L2 and a cover plate (such as an optical low-pass filter, an IR cut filter, a cover glass for protecting a CCD surface) CP in an order from the object side (air side). Among them, the first lens L1 and the second lens L2 are a meniscus lens in which a convex surface is provided on the object side and have positive refractive index, respectively. The first lens L1 and the second lens L2 may be a plastic lens or a glass lens. Further, one of the two lenses may be a plastic lens and the other may be a glass lens.

In case of a plastic lens, it is possible to provide an aspheric surface with a low cost and to provide a low cost image pickup system. On the other hand, in case of a glass lens, it is possible to obtain an advantage that the refractive index is high, the change in the performance and shape due to a temperature change is small, and an influence due to birefringence is small and the like.

On optical surfaces of the optical elements in the present embodiment, an infrared cut coating in which the maximum value of reflectance at the wavelength λ of 800 to 1200 nm is 30% or more is formed on at least two surfaces. An infrared cut coating is a coating having a favorable transmittance to light flux in a visible range and having a substantially low transmittance to light flux in a near-infrared range.

The infrared cut coating of the present invention preferably has a layer structure that satisfies the following conditions when it is assumed that a design wavelength is $\lambda_0$, the refractive index of a low refractive index layer is $n_L$, the thickness of a low refractive layer is $d_L$, the refractive index of a high refractive index layer is $n_H$, the thickness of a high refractive index layer is $d_H$, and each layer of the infrared cut coating is numbered as the first layer, the second layer . . . and the like from the air side.

800 nm $\leq \lambda_0 \leq$ 1200 nm
$1.3 \leq n_L \leq 1.6$
$1.8 \leq n_H \leq 2.3$
The first layer: $0.08\lambda_0 \leq n_L d_L \leq 0.17\lambda_0$
The second layer: $0.2\lambda_0 \leq n_H d_H \leq 0.3\lambda_0$
The third layer: $0.2\lambda_0 \leq n_L d_L \leq 0.3\lambda_0$ The number of layers constituting an infrared cut coating is not limited. However, an even numbered layer from the air side of the infrared cut coating preferably satisfies $0.2\lambda_0 \leq n_H d_H \leq 0.3\lambda_0$ and an odd numbered layer which is numbered as the third layer or more preferably satisfies $0.2\lambda_0 \leq n_L d_L \leq 0.3\lambda_0$.

Alternatively, the image pickup system of the present embodiment also may be formed by combining an infrared cut filter in which a resin having a high refractive index and a resin having a low refractive index are alternatively layered on a thin plastic film, and an image pickup system lens having an infrared cut coating in which the maximum reflectance value at the wavelength λ of 800 to 1200 nm is 30% or more. Instead of a plastic film, an infrared cut coating in which the maximum reflectance value at the wavelength λ of 800 to 1200 nm is 30% or more may be formed on a plurality of surfaces.

It is important for the entire image pickup system to provide transmittance in an infrared region closer to 0% or to reduce the transmittance to a level at which no influence is caused on a predetermined CCD or CMOS sensitivity.

When an infrared cut coating is provided on a plurality of surfaces, the transmittance of the infrared region (800 to 1200 nm) of the entire image pickup system can be calculated by the method as shown below. When it is assumed that an infrared cut coating is formed on four surfaces and each infrared regions has reflectances of x1, x2, x3 and x4, the transmittance can be represented by the following formula: transmittance≈(1−x1)(1−x2)(1−x3)(1−x4). For example, in case of x1=x2=x3=x4=0.6 (reflectance 60%), the transmittance is represented by the following formula: the transmittance≈$(1-0.6)^4$=0.0256 and the transmittance is reduced to about 2.6%. Although it is considered that an actual transmittance may be slightly higher than the above value due to multiple reflection caused in the surface, the transmittance can be approximately obtained by the above calculating formula.

As described above, according to the present invention, it is possible to cut light in a near-infrared region having a wavelength λ of 800 to 1200 nm by combining a plurality of image pickup system optical elements having an infrared cut function.

EXAMPLES

Example 1

Figure 2:
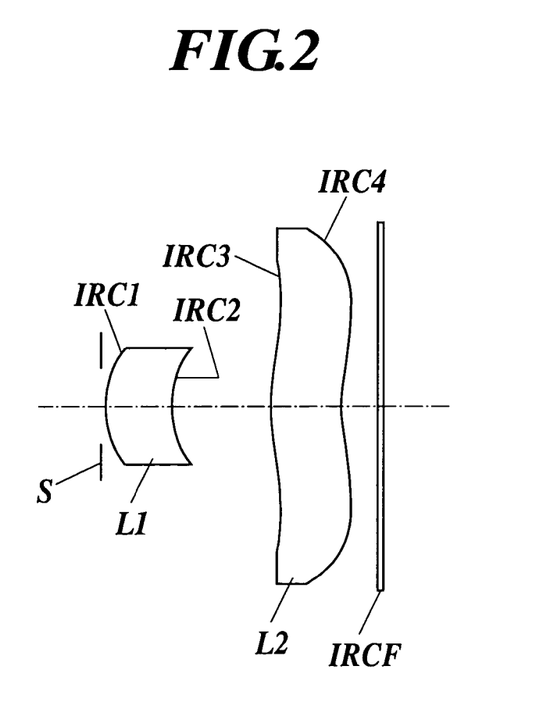
FIG. 2 is a cross-sectional view of a lens of an image pickup system according to Example 1.

Forming Infrared Cut Coatings on Plastic Film and Four Surfaces of Image Pickup System Lens An optical system according to Example 1 will be described with reference to FIG. 2.

Figure 3:
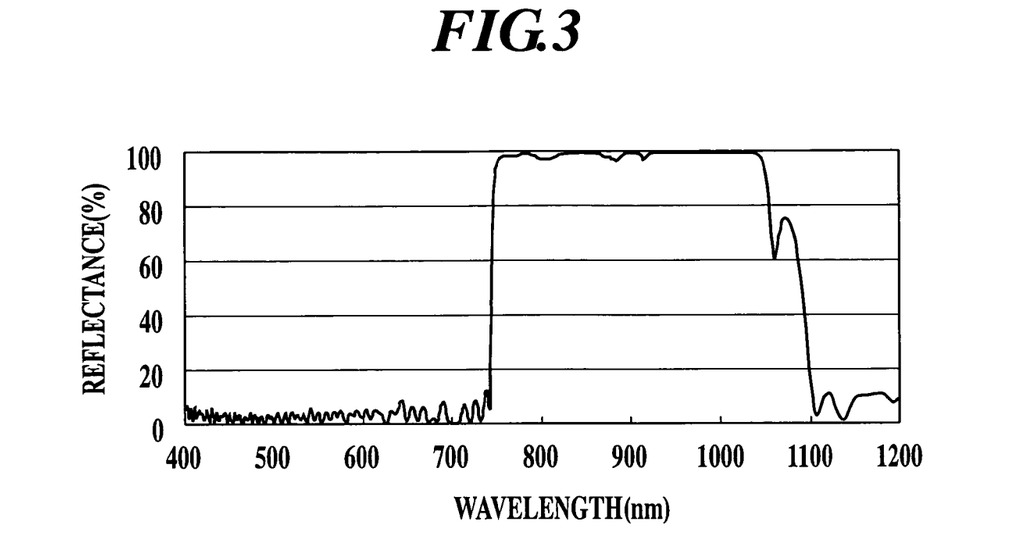
FIG. 3 is a view showing the reflection characteristic of the infrared cut filters in Example 1 and Example 3.
Figure 4:
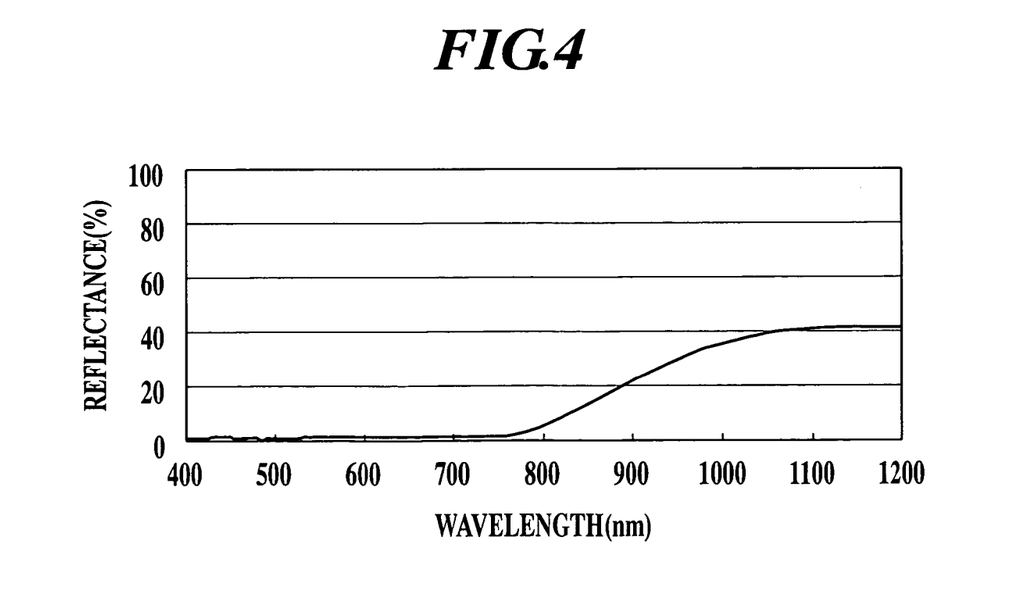
FIG. 4 is a view showing the reflectance characteristic of a lens surface on which the infrared cut coating is provided in Example 1.

In order to cut infrared ray which is incident on a CCD, an infrared cut filter IRCF having 80 layers in which a high refractive index resin (n=1.8) and a low refractive index resin (n=1.5) were alternately layered, was provided on a plastic film substrate. The reflection characteristic is shown in FIG. 3. In case of the infrared cut filter using a plastic film, because the difference in refractive index between high refractive index resin and low refractive index resin cannot be large, the infrared cut filter cannot secure a wide band in which infrared ray can be cut and it is difficult to cover the range of the wavelength λ of 800 to 1200 nm. Thus, an image pickup system which was formed by combining the first lens L1 as a plastic lens on which infrared cut coatings IRC1 and IRC2 having the maximum reflectance value of 30% or more in the wavelength λ of 800 to 1200 nm were formed supplementarily, and the second lens L2 as a plastic lens on which infrared cut coatings IRC3 and IRC4 were formed, was used. The infrared cut coatings IRC1 to IRC4 were prepared by alternately layering material mainly composed of $TiO_2$ and material mainly composed of $SiO_2$ so as to form six layers on a plastic lens, respectively. FIG. 4 shows the reflectance characteristic at one surface of the first lens L1 and that of the second lens L2, respectively. As shown in FIG. 4, each surface of the first lens L1 and the second lens L2 has a sufficient reflection prevention performance in the wavelength λ of 400 to 700 nm in a visible light region. Although each surface of the first lens L1 and the second lens L2 has the maximum reflectance value of about 40% at the wavelength λ of 800 to 1200 nm and does not provide a sufficient performance required for a regular infrared cut filter in a single element, the reflectance at the wavelength λ of 800 to 1200 nm can be set highly by providing the infrared cut coatings having the characteristic of FIG. 4 at four surfaces and combining these coatings with a plastic film type infrared cut filter IRCF having the characteristic of FIG. 3. As described above, according to Example 1, because the infrared cut coatings IRC1 to IRC4 having the characteristic of FIG. 4 are formed on four surfaces of an image pickup system lens and the plastic film-type infrared cut filter IRCF is combined, it is possible to provide an image pickup system having a sufficient reflection prevention performance to visible light and having a high reflectance to the wavelength λ of 800 to 1200 nm. As a result, it is possible to prevent infrared ray from entering CCD.

Example 2

Figure 5:
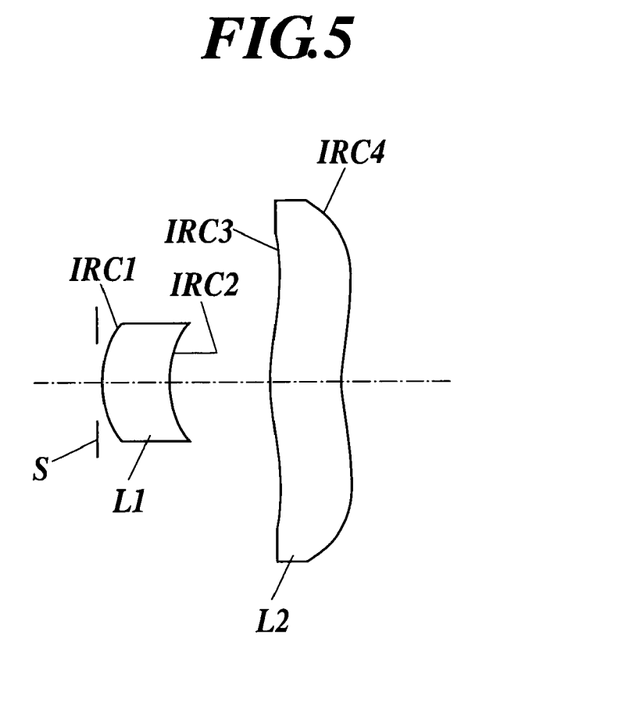
FIG. 5 is a cross-sectional view of a lens of the image pickup system according to Example 1.

Forming Infrared Cut Coatings on a Plurality of Surfaces of Image Pickup System Lens An optical system according to Example 2 will be described with reference to FIG. 5.

Figure 6:
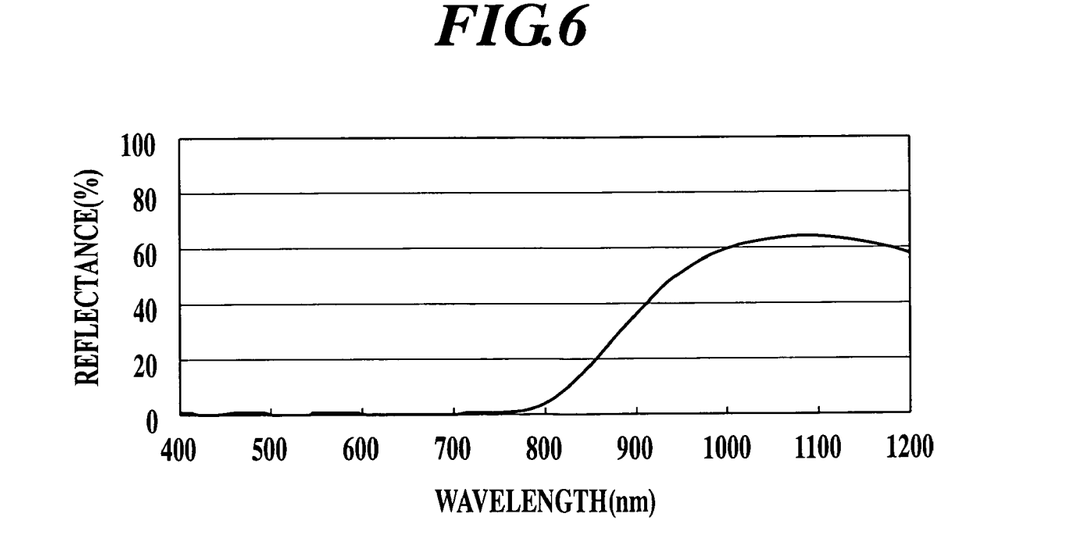
FIG. 6 is a view showing the reflectance characteristic of a lens surface on which the infrared cut coating is provided in Example 2.

In order to cut infrared ray which is incident on a CCD, an image pickup system which was formed by combining the first lens L1 as a plastic lens on which infrared cut coatings IRC1 and IRC2 having the maximum reflectance value of 30% or more in the wavelength λ of 800 to 1200 nm were formed, and the second lens L2 as a plastic lens on which infrared cut coatings IRC3 and IRC4 were formed, was used. The infrared cut coatings IRC1 to IRC4 were prepared by alternately layering material mainly composed of $TiO_2$ and material mainly composed of $SiO_2$ so as to form eight layers on a plastic lens, respectively. FIG. 6 shows the reflectance characteristic at one surface of the first lens L1 and that of the second lens L2, respectively. As shown in FIG. 6, each surface of the first lens L1 and the second lens L2 has a sufficient reflection prevention performance in the wavelength λ of 400 to 700 nm in a visible light region. Although each surface of the first lens L1 and the second lens L2 has the maximum reflectance value of about 60% at the wavelength λ of 800 to 1200 nm and does not provide a sufficient performance required for a regular infrared cut filter, it is possible to provide an image pickup system having a sufficient reflection prevention performance to visible light and having a high reflectance to the wavelength λ of 800 to 1200 nm by forming the infrared cut coatings IRC1 to IRC4 having the characteristic of FIG. 6 are formed on four surfaces of an image pickup system lens. As a result, it is possible to prevent infrared ray from entering CCD.

Example 3

Figure 7:
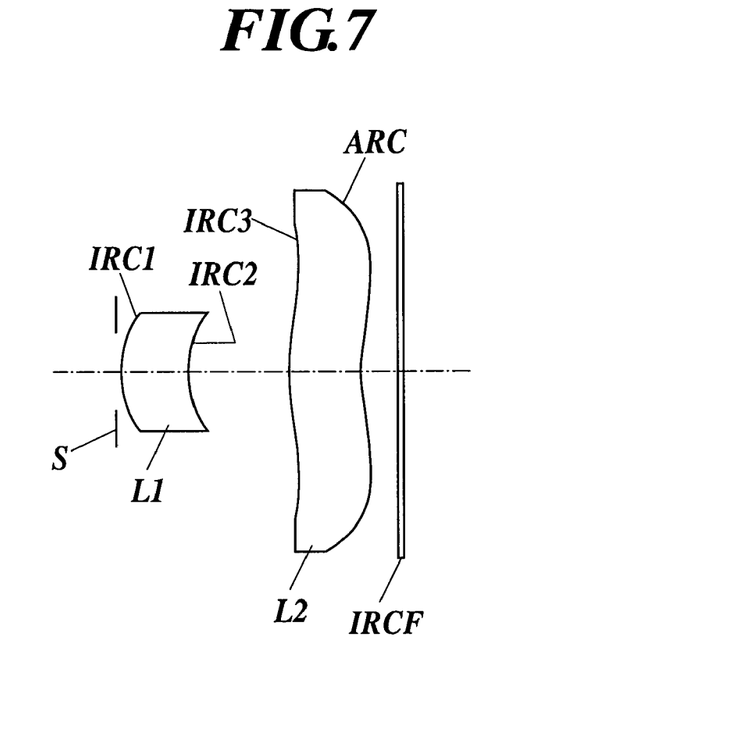
FIG. 7 is a cross-sectional view of a lens of the image pickup system according to Example 3.

Forming Infrared Cut Coatings on Plastic Film and Three Surfaces of Image Pickup System Lens An optical system according to Example 3 will be described with reference to FIG. 7.

In order to cut infrared ray which is incident on a CCD, an infrared cut filter IRCF having 80 layers in which a high refractive index resin (n=1.8) and a low refractive index resin (n=1.5) were alternately layered, was provided on a plastic film substrate. The reflection characteristic is shown in FIG. 3. In case of the plastic film type of infrared cut filter, because the difference in refractive index between high refractive index resin and low refractive index resin cannot be large, the infrared cut filter cannot secure a wide band in which infrared ray can be cut and it is difficult to cover the range of the wavelength λ of 800 to 1200 nm.

Figure 8:
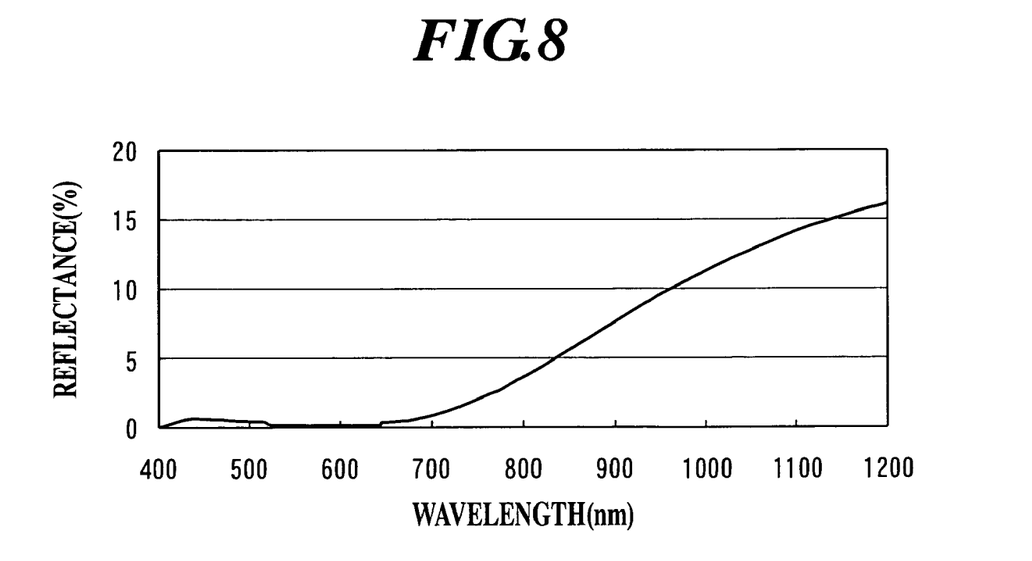
FIG. 8 is a view showing the reflectance characteristic of a lens surface on which the reflection prevention coat is provided in Example 3.

Thus, an image pickup system which was formed by combining the first lens L1 as a plastic lens on which infrared cut coatings IRC1 and IRC2 having the maximum reflectance value of 30% or more in the wavelength λ of 800 to 1200 nm were formed supplementarily, and the second lens L2 as a plastic lens on which an infrared cut coating IRC3 and an antireflection coating ARC were formed, was used. The infrared cut coatings IRC1 to IRC3 were prepared by alternately layering material mainly composed of $TiO_2$ and material mainly composed of $SiO_2$ so as to form eight layers on a plastic lens, respectively. The lens surface on which an infrared cut coating is formed has the same reflectance characteristic as that of Example 2 and the reflectance characteristic is shown in FIG. 6. As shown in FIG. 6, each surface of the first lens L1 and the second lens L2 has a sufficient reflection prevention performance in the wavelength λ of 400 to 700 nm in a visible light region. Although each surface of the first lens L1 and the second lens L2 has the maximum reflectance value of about 60% at the wavelength λ of 800 to 1200 nm and does not provide a sufficient performance required for a regular infrared cut filter, the reflectance at the wavelength λ of 800 to 1200 nm can be set highly by providing the infrared cut coatings having the characteristic of FIG. 6 at three surfaces and combining these coatings with a plastic film type infrared cut filter IRCF having the characteristic of FIG. 3. As described above, according to Example 3, because the infrared cut coatings IRC1 to IRC3 having the characteristic of FIG. 6 are formed on three surfaces which are the first, the second and the third surface, of an image pickup system lens and the plastic film-type infrared cut filter IRCF is combined, it is possible to provide an image pickup system having a sufficient reflection prevention performance to visible light and having a high reflectance to the wavelength λ of 800 to 1200 nm. As a result, it is possible to prevent infrared ray from entering CCD. On the fourth surface of the lens, a regular reflection prevention coating ARC shown in FIG. 8 was formed. The layer structure thereof is shown in Table 1.

TABLE 1

| | Design wavelength $\lambda_0$ = 1000 nm | | | |
|---|---|---|---|---|
| Layer No. | Material | Refractive index(n) | Physical thickness (d) | Optical thickness (nd/$\lambda_0$) |
| | Substrate | 1.52 | | |
| 4 | TiO2 | 2.15 | 33.5 | 0.072 |
| 3 | SiO2 | 1.47 | 189.5 | 0.279 |
| 2 | TiO2 | 2.15 | 121.5 | 0.261 |
| 1 | SiO2 | 1.47 | 87.1 | 0.128 |
| | Air | 1 | | |

The reason why the regular reflection prevention coating was formed on only the fourth surface unlike the first surface to the third surface is as follows. As shown in the structure diagram of the image pickup system, only the fourth surface has a small curvature around the lens and the surface is significantly inclined in an oblique direction. As a result, it is difficult that uniform coating is formed on the periphery by a regular evaporation. In this case, the thickness of the peripheral part becomes thinner and the reflection characteristic is shifted to the short wavelength side. Therefore, it is difficult to provide a sufficient reflection prevention characteristic. However, this problem can be solved by modifying an evaporation method or by using another film forming method, such as sputter.

Hereinafter, specific layer structures and the reflection characteristics of an infrared cut coating used in the present invention, will be explained.

(Infrared Cut Coating 1)

Figure 9:
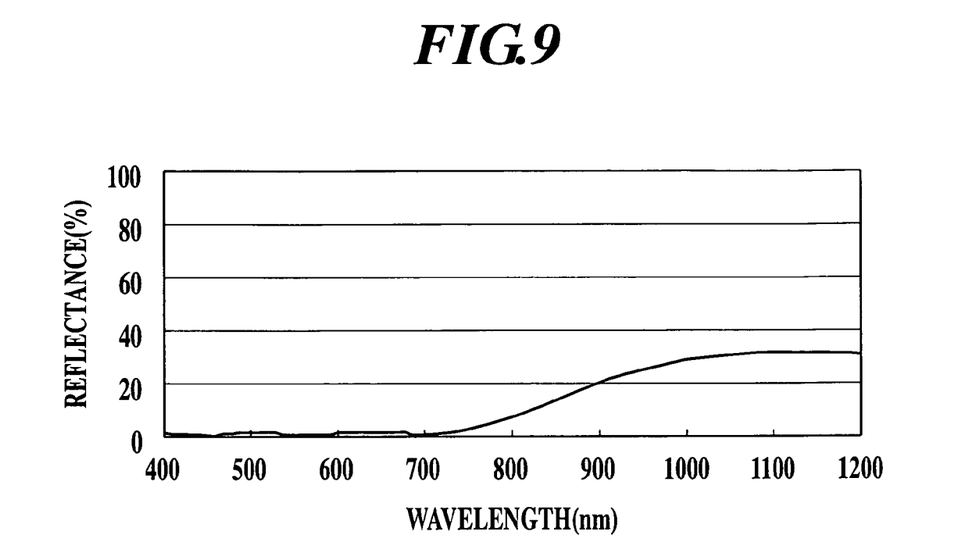
FIG. 9 is a view showing the reflectance characteristic of a lens surface on which the infrared cut coating used in the present invention is provided.

A coating that functions as a reflection prevention film in a visible region and that functions as an infrared cut filter in an infrared region was formed on one optical surface of the image pickup system lens. Specifically, the coating was prepared by alternately layering material mainly composed of $SiO_2$ as low refractive index material and material mainly composed of $TiO_2$ as high refractive index material so as to form six layers. A vacuum evaporation method was used as a film forming method. However, another method, such as sputtering or coating, also may be used. Table 2 shows the layer structure. FIG. 9 shows the reflectance characteristic of one surface of the image pickup system lens. Each layer of the coating is sequentially numbered as the first layer, the second layer and the like from the air side (the uppermost surface of the image pickup system lens).

When a design wavelength was set to a wavelength $\lambda_0$ of 1000 nm, the first layer was made from $SiO_2$ as low refractive index material with a thickness of $0.128\lambda_0$, the second layer was made from $TiO_2$ as high refractive index material with a thickness of $0.261\lambda_0$, and the third layer was made from $SiO_2$ as low refractive index material with a thickness of $0.279\lambda_0$. In this layer structure, the first layer, the fourth layer, the fifth layer and the sixth layer mainly function as a reflection prevention film and the second layer and the third layer mainly function as an infrared cut filter. In particular, the second layer and the third layer were designed to have a thickness of about $0.25\lambda_0$ in the infrared ray wavelength $\lambda_0$ of 1000 nm.

By the structure as described above, the second layer and the third layer respectively have a thickness of about $0.5\lambda_1$ in the visible light wavelength $\lambda_1$ of 500 nm. These layers can be recognized as a non-existing layer in an optical thin film. Further, the reflection prevention performance is not inhibited in the visible region. On the other hand, the second layer and the third layer respectively have a thickness of about $0.25\lambda_0$ in the infrared ray wavelength $\lambda_0$ of 1000 nm. These layers have a basic structure of a reflection film in an optical thin film. Further, the reflectance can be improved in an infrared region.

TABLE 2

Design wavelength $\lambda_0$ = 1000 nm

| Layer No. | Material | Refractive index (n) | Physical thickness (d) | Optical thickness (nd/$\lambda_0$) |
|---|---|---|---|---|
| | Substrate | 1.52 | | |
| 6 | TiO2 | 2.15 | 25.3 | 0.054 |
| 5 | SiO2 | 1.47 | 38.2 | 0.056 |
| 4 | TiO2 | 2.15 | 33.5 | 0.072 |
| 3 | SiO2 | 1.47 | 189.5 | 0.279 |
| 2 | TiO2 | 2.15 | 121.5 | 0.261 |
| 1 | SiO2 | 1.47 | 87.7 | 0.128 |
| | Air | 1 | | |

(Infrared Cut Coating 2)

Figure 10:
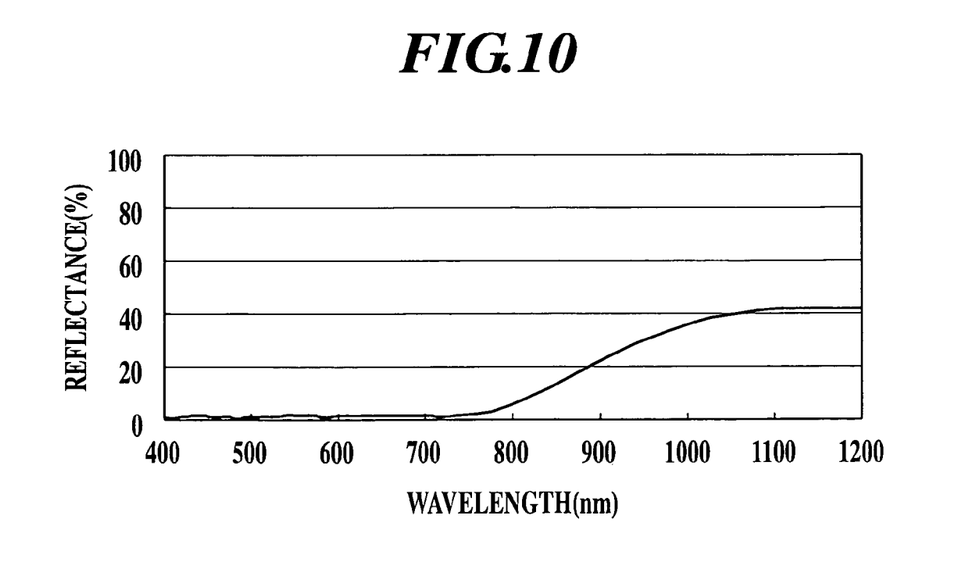
FIG. 10 is a view showing the reflectance characteristic of a lens surface on which the infrared cut coating used in the present invention is provided.

A coating that functions as a reflection prevention film in a visible region and that functions as an infrared cut filter in an infrared region was formed on one optical surface of the image pickup system lens. Specifically, the coating was prepared by alternately layering material mainly composed of $SiO_2$ as low refractive index material and material mainly composed of $TiO_2$ as high refractive index material so as to form six layers. A vacuum evaporation method was used as a film forming method. However, another method, such as sputtering or coating, also may be used. Table 3 shows the layer structure. FIG. 10 shows the reflectance characteristic of one surface of the image pickup system lens. Each layer of the coating is sequentially numbered as the first layer, the second layer and the like from the air side (the uppermost surface of the image pickup system lens).

When a design wavelength was set to a wavelength $\lambda_0$ of 1000 nm, the first layer was made from $SiO_2$ as low refractive index material with a thickness of $0.130\lambda_0$, the second layer was made from $TiO_2$ as high refractive index material with a thickness of $0.260\lambda_0$, the third layer was made from $SiO_2$ as low refractive index material with a thickness of $0.253\lambda_0$ and the fourth layer was made from $TiO_2$ as high refractive index material with a thickness of $0.271\lambda_0$. In this layer structure, the first layer, the fourth layer, the fifth layer and the sixth layer mainly function as a reflection prevention film and the second layer, the third layer and the fourth layer mainly function as an infrared cut filter. In particular, the second layer, the third layer and the fourth layer were designed to have a thickness of about $0.25\lambda_0$ in the infrared ray wavelength $\lambda_0$ of 1000 nm.

By the structure as described above, the second layer to the fourth layer respectively have a thickness of about $0.5\lambda_1$ in the visible light wavelength $\lambda_1$ of 500 nm. These layers can be recognized as a non-existing layer in an optical thin film. Further, the reflection prevention performance is not inhibited in the visible region. On the other hand, the second layer to the fourth layer respectively have a thickness of about $0.25\lambda_0$ in the infrared ray wavelength $\lambda_0$ of 1000 nm. These layers have a basic structure of a reflection film in an optical thin film. Further, the reflectance can be improved in an infrared region.

TABLE 3

Design wavelength $\lambda_0$ = 1000 nm

| Layer No. | Material | Refractive index (n) | Physical thickness (d) | Optical thickness (nd/$\lambda_0$) |
|---|---|---|---|---|
| | Substrate | 1.52 | | |
| 6 | TiO2 | 2.15 | 11.4 | 0.025 |
| 5 | SiO2 | 1.47 | 34.1 | 0.050 |
| 4 | TiO2 | 2.15 | 126.3 | 0.271 |
| 3 | SiO2 | 1.47 | 172.2 | 0.253 |
| 2 | TiO2 | 2.15 | 121.1 | 0.260 |
| 1 | SiO2 | 1.47 | 88.8 | 0.130 |
| | Air | 1 | | |

(Infrared Cut Coating 3)

Figure 11:
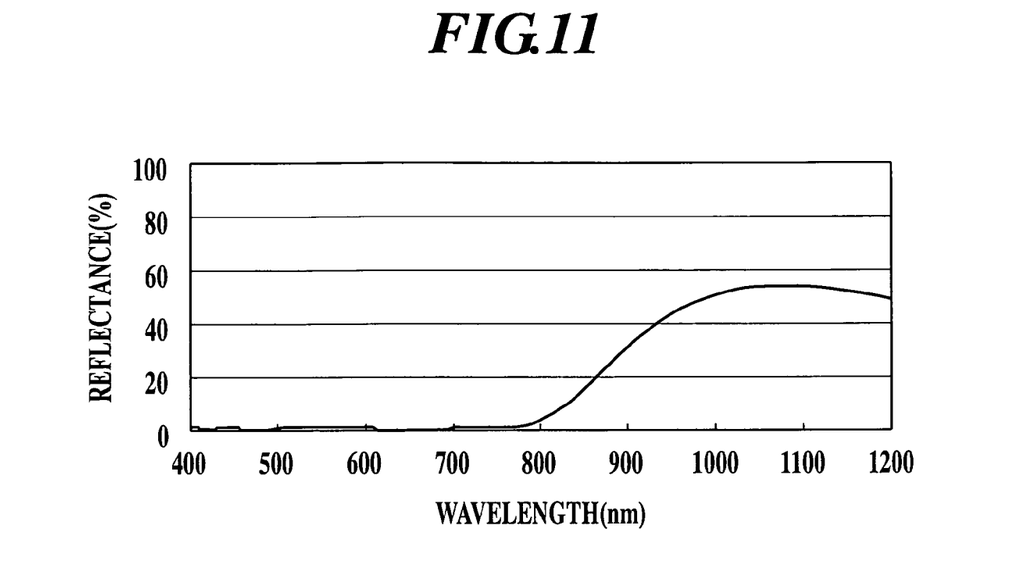
FIG. 11 is a view showing the reflectance characteristic of a lens surface on which the infrared cut coating used in the present invention is provided.

A coating that functions as a reflection prevention film in a visible region and that functions as an infrared cut filter in an infrared region was formed on one optical surface of the image pickup system lens. Specifically, the coating was prepared by alternately layering material mainly composed of $SiO_2$ as low refractive index material and material mainly composed of $TiO_2$ as high refractive index material so as to form eight layers. A vacuum evaporation method was used as a film forming method. However, another method, such as sputtering or coating, also may be used. Table 4 shows the layer structure. FIG. 11 shows the reflectance characteristic of one surface of the image pickup system lens. Each layer of the coating is sequentially numbered as the first layer, the second layer and the like from the air side (the uppermost surface of the image pickup system lens).

When a design wavelength was set to a wavelength $\lambda_0$ of 1000 nm, the first layer was made from $SiO_2$ as low refractive index material with a thickness of $0.130\lambda_0$, the second layer was made from $TiO_2$ as high refractive index material with a thickness of $0.260\lambda_0$, the third layer was made from $SiO_2$ as low refractive index material with a thickness of $0.259\lambda_0$, the fourth layer was made from $TiO_2$ as high refractive index material with a thickness of $0.274\lambda_0$ and the fifth layer was made from $SiO_2$ as low refractive index material with a thickness of $0.285\lambda_0$. In this layer structure, the first layer, the sixth layer, the seventh layer and the eighth layer mainly function as a reflection prevention film and the second layer, the third layer, the fourth layer and the fifth layer mainly function as an infrared cut filter. In particular, the second layer, the third layer, the fourth layer and the fifth layer were designed to have a thickness of about $0.25\lambda_0$ in the infrared ray wavelength $\lambda_0$ of 1000 nm.

By the structure as described above, the second layer to the fifth layer respectively have a thickness of about $0.5\lambda_1$ in the visible light wavelength $\lambda_1$ of 500 nm. These layers can be recognized as a non-existing layer in an optical thin film. Further, the reflection prevention performance is not inhibited in the visible region. On the other hand, the second layer to the fifth layer respectively have a thickness of about $0.25\lambda_0$ in the infrared ray wavelength $\lambda_0$ of 1000 nm. These layers have a basic structure of a reflection film in an optical thin film. Further, the reflectance can be improved in an infrared region.

TABLE 4

Design wavelength $\lambda_0$ = 1000 nm

| Layer No. | Material | Refractive index (n) | Physical thickness (d) | Optical thickness (nd/$\lambda_0$) |
|---|---|---|---|---|
| | Substrate | 1.52 | | |
| 8 | TiO2 | 2.15 | 20.7 | 0.045 |
| 7 | SiO2 | 1.47 | 44.5 | 0.065 |
| 6 | TiO2 | 2.15 | 27.6 | 0.059 |
| 5 | SiO2 | 1.47 | 193.7 | 0.285 |
| 4 | TiO2 | 2.15 | 127.4 | 0.274 |
| 3 | SiO2 | 1.47 | 176.2 | 0.259 |
| 2 | TiO2 | 2.15 | 121.1 | 0.260 |
| 1 | SiO2 | 1.47 | 88.2 | 0.130 |
| | Air | 1 | | |

(Infrared Cut Coating 4)

Figure 12:
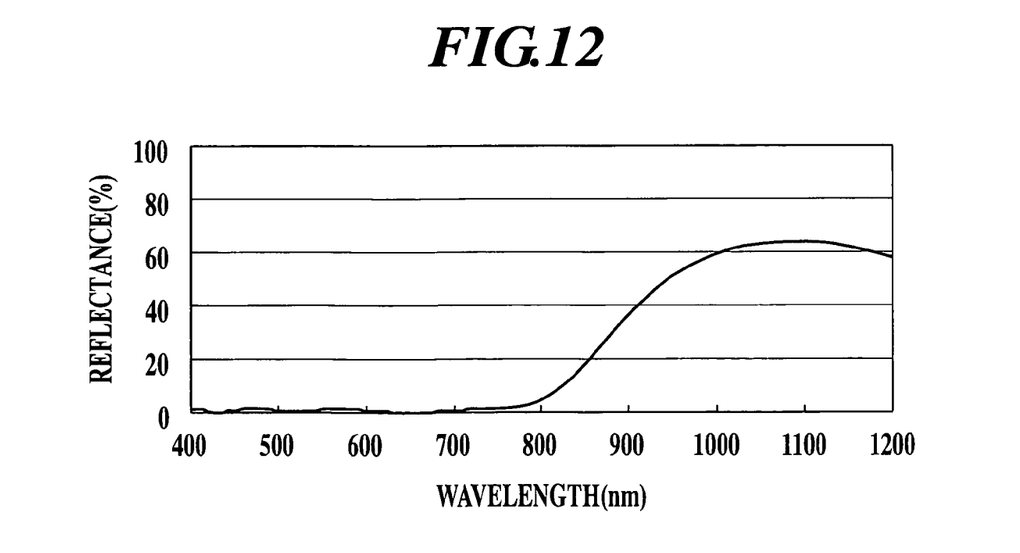
FIG. 12 is a view showing the reflectance characteristic of a lens surface on which the infrared cut coating used in the present invention is provided.

A coating that functions as a reflection prevention film in a visible region and that functions as an infrared cut filter in an infrared region was formed on one optical surface of the image pickup system lens. Specifically, the coating was prepared by alternately layering material mainly composed of $SiO_2$ as low refractive index material and material mainly composed of $TiO_2$ as high refractive index material so as to form eight layers. A vacuum evaporation method was used as a film forming method. However, another method, such as sputtering or coating, also may be used. Table 5 shows the layer structure. FIG. 12 shows the reflectance characteristic of one surface of the image pickup system lens. Each layer of the coating is sequentially numbered as the first layer, the second layer and the like from the air side (the uppermost surface of the image pickup system lens).

When a design wavelength was set to a wavelength $\lambda_0$ of 1000 nm, the first layer was made from $SiO_2$ as low refractive index material with a thickness of $0.133\lambda_0$, the second layer was made from $TiO_2$ as high refractive index material with a thickness of $0.258\lambda_0$, the third layer was made from $SiO_2$ as low refractive index material with a thickness of $0.257\lambda_0$, the fourth layer was made from $TiO_2$ as high refractive index material with a thickness of $0.256\lambda_0$, the fifth layer was made from $SiO_2$ as low refractive index material with a thickness of $0.257\lambda_0$, and the sixth layer was made from $TiO_2$ as high refractive index material with a thickness of $0.280\lambda_0$. In this layer structure, the first layer, the seventh layer and the eighth layer mainly function as a reflection prevention film and the second layer, the third layer, the fourth layer, the fifth layer and the sixth layer mainly function as an infrared cut filter. In particular, the second layer, the third layer, the fourth layer, the fifth layer and the sixth layer were designed to have a thickness of about $0.25\lambda_0$ in the infrared ray wavelength $\lambda_0$ of 1000 nm.

By the structure as described above, the second layer to the sixth layer respectively have a thickness of about $0.5\lambda_1$ in the visible light wavelength $\lambda_1$ of 500 nm. These layers can be recognized as a non-existing layer in an optical thin film. Further, the reflection prevention performance is not inhibited in the visible region. On the other hand, the second layer to the sixth layer respectively have a thickness of about $0.25\lambda_0$ in the infrared ray wavelength $\lambda_0$ of 1000 nm. These layers have a basic structure of a reflection film in an optical thin film. Further, the reflectance can be improved in an infrared region.

TABLE 5

Design wavelength $\lambda_0$ = 1000 nm

| Layer No. | Material | Refractive index (n) | Physical thickness (d) | Optical thickness (nd/$\lambda_0$) |
|---|---|---|---|---|
| | Substrate | 1.52 | | |
| 8 | TiO2 | 2.15 | 14.2 | 0.030 |
| 7 | SiO2 | 1.47 | 36.0 | 0.053 |
| 6 | TiO2 | 2.15 | 130.2 | 0.280 |
| 5 | SiO2 | 1.47 | 175.1 | 0.257 |
| 4 | TiO2 | 2.15 | 119.1 | 0.256 |
| 3 | SiO2 | 1.47 | 175.2 | 0.257 |
| 2 | TiO2 | 2.15 | 120.2 | 0.258 |
| 1 | SiO2 | 1.47 | 90.5 | 0.133 |
| | Air | 1 | | |

(Infrared Cut Coating 5)

Figure 13:
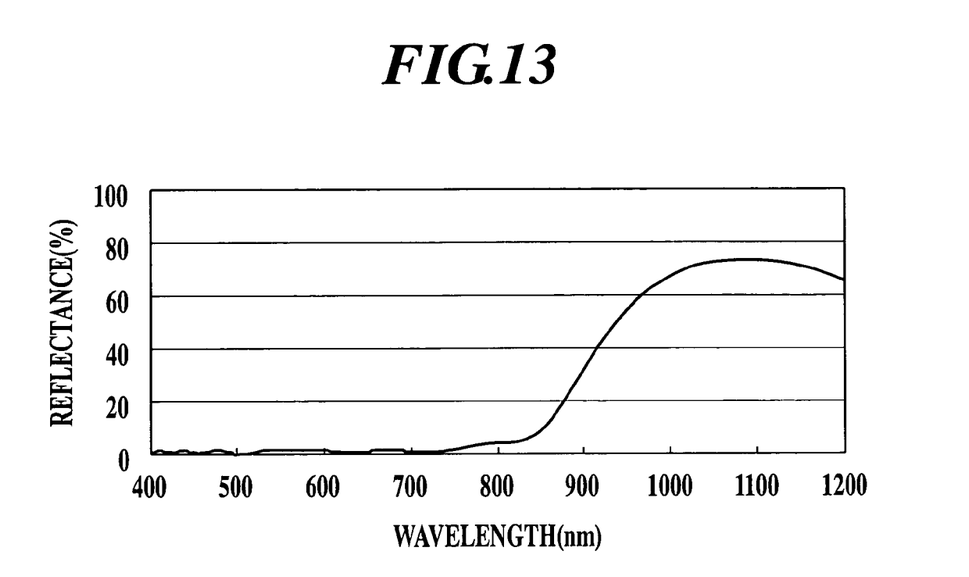
FIG. 13 is a view showing the reflectance characteristic of a lens surface on which the infrared cut coating used in the present invention is provided.

A coating that functions as a reflection prevention film in a visible region and that functions as an infrared cut filter in an infrared region was formed on one optical surface of the image pickup system lens. Specifically, the coating was prepared by alternately layering material mainly composed of $SiO_2$ as low refractive index material and material mainly composed of $TiO_2$ as high refractive index material so as to form ten layers. A vacuum evaporation method was used as a film forming method. However, another method, such as sputtering or coating, also may be used. Table 6 shows the layer structure. FIG. 13 shows the reflectance characteristic of one surface of the image pickup system lens. Each layer of the coating is sequentially numbered as the first layer, the second layer and the like from the air side (the uppermost surface of the image pickup system lens).

When a design wavelength was set to a wavelength $\lambda_0$ of 1000 nm, the first layer was made from $SiO_2$ as low refractive index material with a thickness of $0.136\lambda_0$, the second layer was made from $TiO_2$ as high refractive index material with a thickness of $0.272\lambda_0$, the third layer was made from $SiO_2$ as low refractive index material with a thickness of $0.268\lambda_0$, the fourth layer was made from $TiO_2$ as high refractive index material with a thickness of $0.277\lambda_0$, the fifth layer was made from $SiO_2$ as low refractive index material with a thickness of $0.264\lambda_0$, the sixth layer was made from $TiO_2$ as high refractive index material with a thickness of $0.267\lambda_0$, and the seventh layer was made from $SiO_2$ as low refractive index material with a thickness of $0.287\lambda_0$. In this layer structure, the first layer, the eighth layer, the ninth layer and the tenth layer mainly function as a reflection prevention film and the second layer, the third layer, the fourth layer, the fifth layer, the sixth layer and the seventh layer mainly function as an infrared cut filter. In particular, the second layer, the third layer, the fourth layer, the fifth layer, the sixth layer and the seventh layer were designed to have a thickness of about $0.25\lambda_0$ in the infrared ray wavelength $\lambda_0$ of 1000 nm.

By the structure as described above, the second layer to the seventh layer respectively have a thickness of about $0.5\lambda_1$ in the visible light wavelength $\lambda_1$ of 500 nm. These layers can be recognized as a non-existing layer in an optical thin film. Further, the reflection prevention performance is not inhibited in the visible region. On the other hand, the second layer to the seventh layer respectively have a thickness of about $0.25\lambda_0$ in the infrared ray wavelength $\lambda_0$ of 1000 nm. These layers have a basic structure of a reflection film in an optical thin film. Further, the reflectance can be improved in an infrared region.

TABLE 6

Design wavelength $\lambda_0$ = 1000 nm

| Layer No. | Material | Refractive index (n) | Physical thickness (d) | Optical thickness (nd/$\lambda_0$) |
|---|---|---|---|---|
|  | Substrate | 1.52 |  |  |
| 10 | TiO2 | 2.15 | 22.5 | 0.048 |
| 9 | SiO2 | 1.47 | 45.1 | 0.066 |
| 8 | TiO2 | 2.15 | 30.4 | 0.065 |
| 7 | SiO2 | 1.47 | 195.5 | 0.287 |
| 6 | TiO2 | 2.15 | 124.0 | 0.267 |
| 5 | SiO2 | 1.47 | 179.8 | 0.264 |
| 4 | TiO2 | 2.15 | 129.0 | 0.277 |
| 3 | SiO2 | 1.47 | 182.3 | 0.268 |
| 2 | TiO2 | 2.15 | 126.7 | 0.272 |
| 1 | SiO2 | 1.47 | 92.9 | 0.136 |
|  | Air | 1 |  |  |

(Infrared Cut Coating 6)

Figure 14:
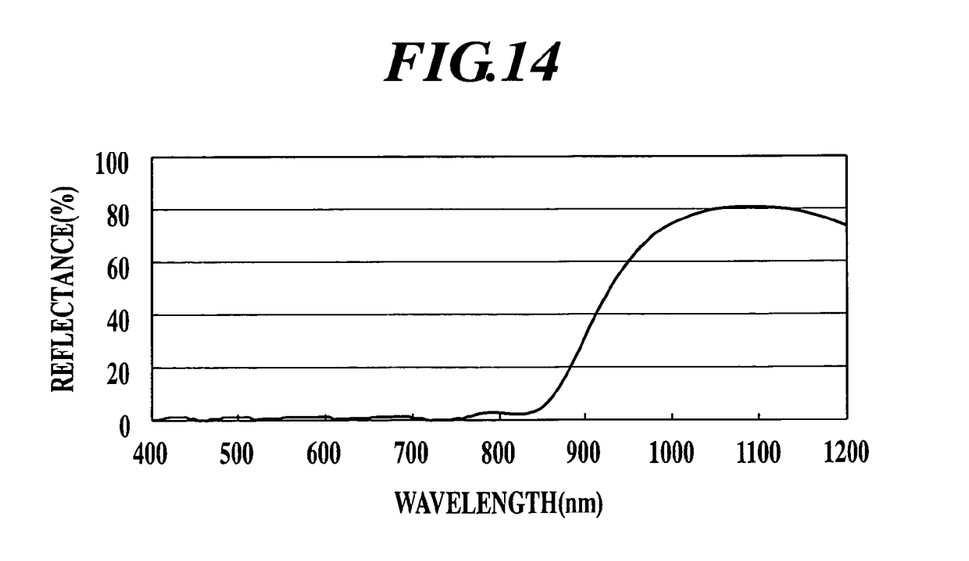
FIG. 14 is a view showing the reflectance characteristic of a lens surface on which the infrared cut coating used in the present invention is provided.

A coating that functions as a reflection prevention film in a visible region and that functions as an infrared cut filter in an infrared region was formed on one optical surface of the image pickup system lens. Specifically, the coating was prepared by alternately layering material mainly composed of $SiO_2$ as low refractive index material and material mainly composed of $TiO_2$ as high refractive index material so as to form ten layers. A vacuum evaporation method was used as a film forming method. However, another method, such as sputtering or coating, also may be used. Table 7 shows the layer structure. FIG. 14 shows the reflectance characteristic of one surface of the image pickup system lens. Each layer of the coating is sequentially numbered as the first layer, the second layer and the like from the air side (the uppermost surface of the image pickup system lens).

When a design wavelength was set to a wavelength $\lambda_0$ of 1000 nm, the first layer was made from $SiO_2$ as low refractive index material with a thickness of $0.125\lambda_0$, the second layer was made from $TiO_2$ as high refractive index material with a thickness of $0.274\lambda_0$, the third layer was made from $SiO_2$ as low refractive index material with a thickness of $0.267\lambda_0$, the fourth layer was made from $TiO_2$ as high refractive index material with a thickness of $0.269\lambda_0$, the fifth layer was made from $SiO_2$ as low refractive index material with a thickness of $0.267\lambda_0$, the sixth layer was made from $TiO_2$ as high refractive index material with a thickness of $0.264\lambda_0$, the seventh layer was made from $SiO_2$ as low refractive index material with a thickness of $0.267\lambda_0$ and the eighth layer was made from $TiO_2$ as high refractive index material with a thickness of $0.284\lambda_0$. In this layer structure, the first layer, the ninth layer, the tenth layer and the tenth layer mainly function as a reflection prevention film and the second layer, the third layer, the fourth layer, the fifth layer, the sixth layer and the eighth layer mainly function as an infrared cut filter. In particular, the second layer, the third layer, the fourth layer, the fifth layer, the sixth layer, the seventh layer and the eighth layer were designed to have a thickness of about $0.25\lambda_0$ in the infrared ray wavelength $\lambda_0$ of 1000 nm.

By the structure as described above, the second layer to the eighth layer respectively have a thickness of about $0.5\lambda_1$ in the visible light wavelength $\lambda_1$ of 500 nm. These layers can be recognized as a non-existing layer in an optical thin film. Further, the reflection prevention performance is not inhibited in the visible region. On the other hand, the second layer to the eighth layer respectively have a thickness of about $0.25\lambda_0$ in the infrared ray wavelength $\lambda_0$ of 1000 nm. These layers have a basic structure of a reflection film in an optical thin film. Further, the reflectance can be improved in an infrared region.

TABLE 7

Design wavelength $\lambda_0$ = 1000 nm

| Layer No. | Material | Refractive index (n) | Physical thickness (d) | Optical thickness (nd/$\lambda_0$) |
|---|---|---|---|---|
|  | Substrate | 1.52 |  |  |
| 10 | TiO2 | 2.15 | 12.9 | 0.028 |
| 9 | SiO2 | 1.47 | 38.1 | 0.056 |
| 8 | TiO2 | 2.15 | 131.9 | 0.284 |
| 7 | SiO2 | 1.47 | 181.6 | 0.267 |
| 6 | TiO2 | 2.15 | 122.7 | 0.264 |
| 5 | SiO2 | 1.47 | 181.4 | 0.267 |
| 4 | TiO2 | 2.15 | 125.1 | 0.269 |
| 3 | SiO2 | 1.47 | 181.3 | 0.267 |
| 2 | TiO2 | 2.15 | 127.6 | 0.274 |
| 1 | SiO2 | 1.47 | 84.8 | 0.125 |
|  | Air | 1 |  |  |

The entire disclosure of a Japanese Patent Application No. 2006-22464, filed on Jan. 31, 2006, including specifications, claims, drawings and summaries are incorporated herein by reference in their entirety.

What is claimed is:

1. An image pickup system comprising one or more optical elements, wherein an infrared cut coating in which a maximum value of reflectance at a wavelength $\lambda$ of 800 to 1200 nm is 30% or more, is formed on at least two optical surfaces of the optical elements, wherein the image pickup system has a layered structure in which when a design wavelength is $\lambda_0$, a refractive index of a low refractive index layer is $n_L$, a thickness of the low refractive index layer is $d_L$, a refractive index of a high refractive index layer is $n_H$, a thickness of the high refractive index layer is $d_H$, wherein the layered structure includes at least three layers, each layer of the infrared cut coating being sequentially numbered as at least a first layer, a second layer, and a third layer from an air side, and wherein the infrared cut coating satisfies following conditions:

800 nm$\leq\lambda_0\leq$1200 nm, $1.3\leq n_L\leq 1.6$, $1.8\leq n_H\leq 2.3$, the first layer satisfies $0.08\lambda_0\leq n_L d_L\leq 0.17\lambda_0$, the second layer satisfies $0.2\lambda_0\leq n_H d_H\leq 0.3\lambda_0$, and the third layer satisfies $0.2\lambda_0\leq n_L d_L\leq 0.3\lambda_0$.

2. The image pickup system of claim 1, wherein at least one optical surface of the optical elements has the infrared cut coating on a glass substrate.

3. The image pickup system of claim 1, wherein at least one optical surface of the optical elements has the infrared cut coating on a plastic film.

4. The image pickup system of claim 1, wherein at least one optical surface of the optical elements has the infrared cut coating on an image pickup lens.

5. The image pickup system of claim 4, wherein the image pickup lens on which the infrared cut coating is formed, is made of plastic.

6. The image pickup system of claim 1, wherein at least two optical surfaces of the optical elements have the infrared cut coating on an image pickup lens.

7. The image pickup system of claim 6, wherein the image pickup lens on which the infrared cut coating is formed, is made of plastic.

8. The image pickup system of claim 1, wherein the layered structure further includes a fourth layer that satisfies $0.2\lambda_0 \leq n_H d_H \leq 0.3\lambda_0$.

9. The image pickup system of claim 1, wherein the layered structure further includes a fourth layer that satisfies $0.2\lambda_0 \leq n_L d_L \leq 0.3\lambda_0$.

10. The image pickup system of claim 1 wherein the layered structure further includes a fourth layer that satisfies $0.2\lambda_0 \leq n_H d_H \leq 0.3\lambda_0$.

11. The image pickup system of claim 1, wherein the layered structure further includes a fourth layer that satisfies $0.2\lambda_0 \leq n_L d_L \leq 0.3\lambda_0$.

12. The image pickup system of claim 1, wherein the layered structure further includes a fourth layer that satisfies $0.2\lambda_0 \leq n_H d_H \leq 0.3\lambda_0$.

* * * * *